(12) United States Patent
Aotani et al.

(10) Patent No.: US 12,275,406 B2
(45) Date of Patent: Apr. 15, 2025

(54) VEHICLE CONTROL DEVICE, STORAGE MEDIUM STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota Aichi-ken (JP)

(72) Inventors: Yoshihiro Aotani, Kawasaki Kanagawa-ken (JP); Eiki Kitagawa, Edogawa-ku Tokyo-to (JP); Satoru Akahane, Shinjuku-ku Tokyo-to (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 154 days.

(21) Appl. No.: 18/228,837

(22) Filed: Aug. 1, 2023

(65) Prior Publication Data

US 2024/0051536 A1 Feb. 15, 2024

(30) Foreign Application Priority Data

Aug. 10, 2022 (JP) ................................. 2022-128121

(51) Int. Cl.
*B60W 30/18* (2012.01)

(52) U.S. Cl.
CPC ... *B60W 30/18009* (2013.01); *B60W 2552/05* (2020.02); *B60W 2552/10* (2020.02); *B60W 2554/4041* (2020.02); *B60W 2554/4045* (2020.02); *B60W 2554/804* (2020.02); *B60W 2754/30* (2020.02)

(58) Field of Classification Search
CPC ....... B60W 30/18009; B60W 2552/05; B60W 2552/10; B60W 2554/4041; B60W 2554/4045; B60W 2554/804; B60W 2754/30; B60W 2720/10; B60W 30/0956; B60W 30/18154; B60W 30/0953; B60W 30/18163
See application file for complete search history.

(56) References Cited

U.S. PATENT DOCUMENTS

| | | | |
|---|---|---|---|
| 2019/0367026 A1 | 12/2019 | Hattori et al. | |
| 2020/0180641 A1* | 6/2020 | Hashimoto | B60W 30/18163 |
| 2020/0208998 A1* | 7/2020 | Xiang | G06F 16/29 |

(Continued)

FOREIGN PATENT DOCUMENTS

| | | |
|---|---|---|
| JP | 6597344 B2 | 10/2019 |
| JP | 6897170 B2 | 6/2021 |
| JP | 2021-142902 A | 9/2021 |

*Primary Examiner* — Ashley L Redhead, Jr.
(74) *Attorney, Agent, or Firm* — Dinsmore & Shohl LLP

(57) ABSTRACT

A vehicle control device has a processor configured to set location 1 on an adjacent lane to be used for determining that an own vehicle is to travel ahead of another vehicle and set location 2 on the adjacent lane for determining to create a space allowing the other vehicle to move ahead of the own vehicle, determine whether a relationship 1 is satisfied in which a location of the own vehicle is ahead of the other vehicle while the other vehicle moves to location 1, determine whether a relationship 2 is satisfied in which a location of the own vehicle is behind the other vehicle while the other vehicle moves to location 2, and decide to cause the own vehicle to travel ahead of the other vehicle when relationship 1 is satisfied or decide to create a space ahead of the own vehicle when relationship 2 is satisfied.

9 Claims, 6 Drawing Sheets

(56) References Cited

U.S. PATENT DOCUMENTS

| | | | |
|---|---|---|---|
| 2022/0306116 A1* | 9/2022 | Hashimoto | B60W 30/18163 |
| 2024/0059288 A1* | 2/2024 | Nakatsuru | B60W 30/162 |
| 2024/0326809 A1* | 10/2024 | Kaneko | B60W 30/16 |
| 2024/0336192 A1* | 10/2024 | Nemoto | B60Q 9/00 |

* cited by examiner

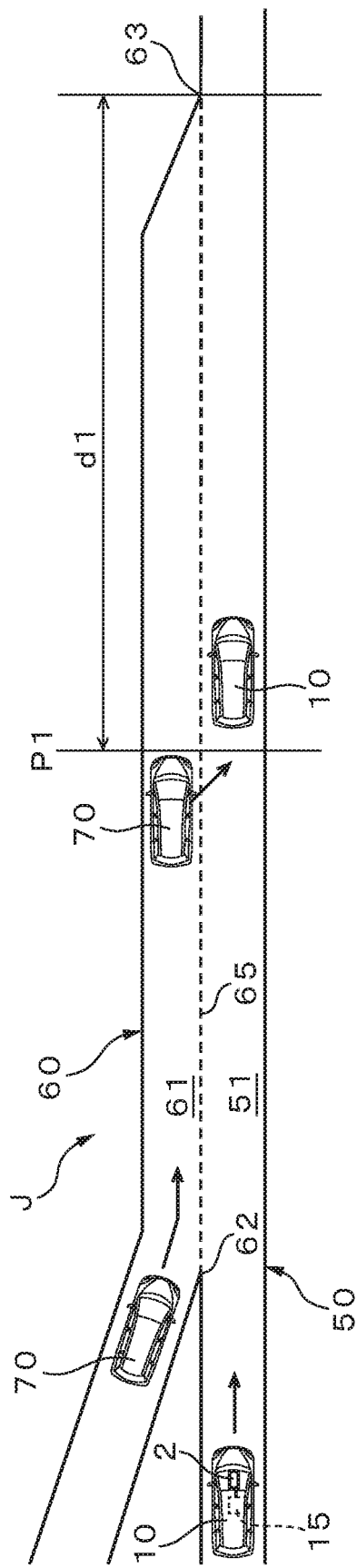
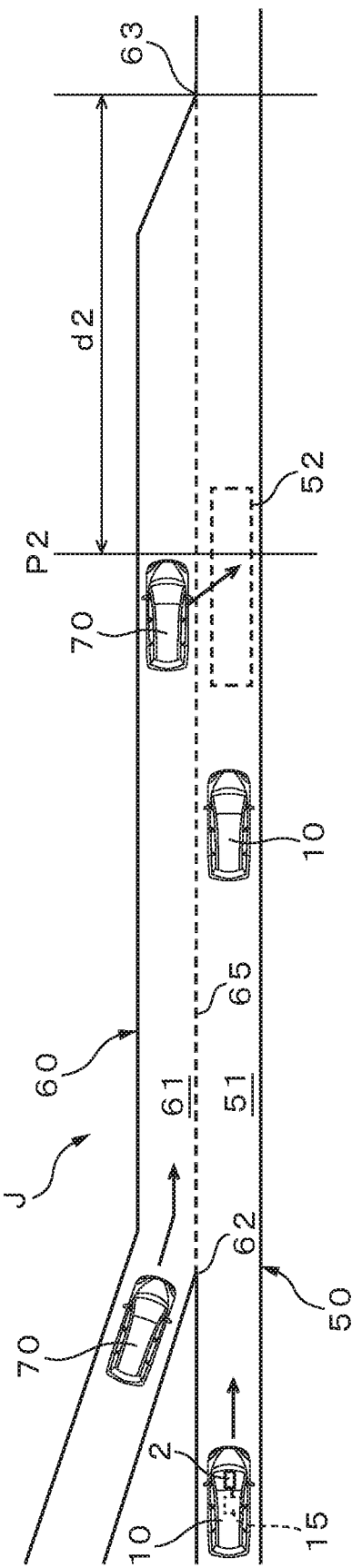

VEHICLE CONTROL DEVICE, STORAGE MEDIUM STORING COMPUTER PROGRAM FOR VEHICLE CONTROL, AND METHOD FOR CONTROLLING VEHICLE

CROSS-REFERENCE TO RELATED APPLICATION

This application claims priority to Japanese Patent Application No. 2022-128121 filed on Aug. 10, 2022, the entire contents of which are herein incorporated by reference.

FIELD

The present disclosure relates to a vehicle control device, a storage medium storing a computer program for vehicle control, and a method for controlling a vehicle.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route.

In an adjacent terrain where an adjacent lane which is adjacent to a traveling lane in which an own vehicle is traveling merges with the traveling lane and vanishes, other vehicles traveling in the adjacent lane move toward the traveling lane. When another vehicle traveling in the adjacent lane is detected in front of the own vehicle, the automatic control system of the own vehicle creates a space allowing the other vehicle to move ahead of the own vehicle (yield control), to an extent allowing creation of a driving plan, controlling the own vehicle so that the other vehicle can move into the traveling lane.

For example, Japanese Unexamined Patent Publication No. 2021-142902 proposes a control device that controls deceleration to decelerate the own vehicle in situations where at least part of another vehicle overlaps with the own vehicle when the other vehicle is viewed from the side, and the other vehicle is located further ahead of the own vehicle. This allows the control device to create a space for movement of the other vehicle ahead of the own vehicle.

SUMMARY

Since in the adjacent terrain any other vehicle traveling in the adjacent lane will definitely move into the traveling lane, the driver also predicts the relationship between the other vehicle traveling in the adjacent lane and their own vehicle and judges operation of their own vehicle, based on the driver's own driving experience.

Consequently, driving by an automatic control system in the adjacent terrain has sometimes diverged from the operation of the own vehicle by the driver, as judged by the driver.

It is an object of the present disclosure to provide a vehicle control device that can control the vehicle in the adjacent terrain so that it is operated with low divergence from operation of the vehicle as would be commonly judged by the driver.

(1) One embodiment of the present disclosure provides a vehicle control device. The vehicle control device has a processor configured to determine whether or not an adjacent terrain where an adjacent lane is adjacent to a traveling lane in which an own vehicle is traveling, between an adjacent start location where the adjacent lane begins to be adjacent to the traveling lane and an adjacent end location where the adjacent lane ceases to be adjacent to the traveling lane, is within a predetermined range ahead of the own vehicle, set a first reference location on the adjacent lane to be used for determining whether or not the own vehicle is to travel ahead of another vehicle before the other vehicle moves to the traveling lane, and to set a second reference location on the adjacent lane to be used for determining whether or not to create a space allowing the other vehicle to move ahead of the own vehicle, when it has been determined that the adjacent terrain exists and the other vehicle traveling in the adjacent lane has been detected, determine whether or not a first relationship is satisfied in which a location of the own vehicle is ahead of a location of the other vehicle while the other vehicle is moving from the other vehicle's current location to the first reference location, based on respective speeds of the own vehicle and the other vehicle and respective locations of the own vehicle and the other vehicle, determine whether or not a second relationship is satisfied in which a location of the own vehicle is behind a location of the other vehicle while the other vehicle is moving from the other vehicle's current location to the second reference location, based on the respective speeds of the own vehicle and the other vehicle and the respective locations of the own vehicle and the other vehicle, and decide to cause the own vehicle to travel ahead of the other vehicle before the other vehicle moves to the traveling lane when it has been determined that the first relationship is satisfied, or to decide to create a space allowing the other vehicle to move ahead of the own vehicle when it has been determined that the second relationship is satisfied.

(2) In the vehicle control device of (1), the first relationship may include that the speed of the own vehicle is faster than the speed of the other vehicle and the location of the own vehicle is ahead of the location of the other vehicle, while the other vehicle is moving from the other vehicle's current location to the first reference location.

(3) In the vehicle control device of (2), the processor may be further configured to determine whether or not the first relationship is satisfied, assuming that the own vehicle is traveling at a speed of the own vehicle at the determining time and the other vehicle is traveling at a speed of the other vehicle at the determining time.

(4) In the vehicle control device of any of (1) to (3), the second relationship may include that the speed of the own vehicle is slower than the speed of the other vehicle and the location of the own vehicle is behind the location of the other vehicle, while the other vehicle is moving from the other vehicle's current location to the second reference location.

(5) In the vehicle control device of (4), the processor may be further configured to determine whether or not the second relationship is satisfied, assuming that the own vehicle is traveling at constant deceleration and the other vehicle is traveling at constant acceleration.

(6) In the vehicle control device of any of (1) to (5), the processor may be further configured to set the first reference location and second reference location on the adjacent lane, when it has been determined that the adjacent terrain exists and the other vehicle traveling in the adjacent lane has been detected ahead of the own vehicle.
(7) In the vehicle control device of any one of (1) to (6), the processor may be further configured to set the first reference location and second reference location based on a speed limit of a road on which the own vehicle is traveling, the distance for which the adjacent lane is adjacent to the traveling lane, or a speed limit for the adjacent lane in which the other vehicle is traveling.
(8) According to another embodiment, a storage medium storing a computer program for vehicle control is provided. The computer program for vehicle control executes a process, and the process includes determining whether or not an adjacent terrain where an adjacent lane is adjacent to a traveling lane in which an own vehicle is traveling, between an adjacent start location where the adjacent lane begins to be adjacent to the traveling lane and an adjacent end location where the adjacent lane ceases to be adjacent to the traveling lane, is within a predetermined range ahead of the own vehicle, setting a first reference location on the adjacent lane to be used for determining whether or not the own vehicle is to travel ahead of the other vehicle before the other vehicle moves to the traveling lane, and setting a second reference location on the adjacent lane to be used for determining whether or not to create a space allowing the other vehicle to move ahead of the own vehicle, when it has been determined that the adjacent terrain exists and the other vehicle traveling in the adjacent lane has been detected, determining whether or not a first relationship is satisfied in which a location of the own vehicle is ahead of a location of the other vehicle while the other vehicle is moving from the other vehicle's current location to the first reference location, based on respective speeds of the own vehicle and the other vehicle and respective locations of the own vehicle and the other vehicle, determining whether or not a second relationship is satisfied in which a location of the own vehicle is behind a location of the other vehicle while the other vehicle is moving from the other vehicle's current location to the second reference location, based on the respective speeds of the own vehicle and the other vehicle and the respective locations of the own vehicle and the other vehicle, and deciding to cause the own vehicle to travel ahead of the other vehicle before the other vehicle moves to the traveling lane when it has been determined that the first relationship is satisfied, or deciding to create a space allowing the other vehicle to move ahead of the own vehicle when it has been determined that the second relationship is satisfied.
(9) Another embodiment of the present disclosure provides a method for controlling a vehicle. The method for controlling a vehicle is carried out by a vehicle control device and includes determining whether or not an adjacent terrain where an adjacent lane is adjacent to a traveling lane in which an own vehicle is traveling, between an adjacent start location where the adjacent lane begins to be adjacent to the traveling lane and an adjacent end location where the adjacent lane ceases to be adjacent to the traveling lane, is within a predetermined range ahead of the own vehicle, setting a first reference location on the adjacent lane to be used for determining whether or not the own vehicle is to travel ahead of the other vehicle before the other vehicle moves to the traveling lane, and setting a second reference location on the adjacent lane to be used for determining whether or not to create a space allowing the other vehicle to move ahead of the own vehicle, when it has been determined that the adjacent terrain exists and the other vehicle traveling in the adjacent lane has been detected, determining whether or not a first relationship is satisfied in which a location of the own vehicle is ahead of a location of the other vehicle while the other vehicle is moving from the other vehicle's current location to the first reference location, based on respective speeds of the own vehicle and the other vehicle and respective locations of the own vehicle and the other vehicle, determining whether or not a second relationship is satisfied in which a location of the own vehicle is behind a location of the other vehicle while the other vehicle is moving from the other vehicle's current location to the second reference location, based on the respective speeds of the own vehicle and the other vehicle and the respective locations of the own vehicle and the other vehicle, and deciding to cause the own vehicle to travel ahead of the other vehicle before the other vehicle moves to the traveling lane when it has been determined that the first relationship is satisfied, or deciding to create a space allowing the other vehicle to move ahead of the own vehicle when it has been determined that the second relationship is satisfied.

The vehicle control device of the present disclosure allows a vehicle to be controlled in the adjacent terrain so that it is operated with low divergence from general operation of a vehicle as judged by the driver.

The object and advantages of the present disclosure will be realized and attained by the elements and combinations particularly pointed out in the claims. It is to be understood that both the foregoing general description and the following detailed description are exemplary and explanatory and are not restrictive of the present disclosure, as claimed.

BRIEF DESCRIPTION OF DRAWINGS

FIG. 1A is a diagram showing operation of the drive planning device of an embodiment of the present disclosure in overview (1).

FIG. 1B is a diagram showing operation of the drive planning device of an embodiment of the present disclosure in overview (2).

DESCRIPTION OF EMBODIMENTS

Figure 2:
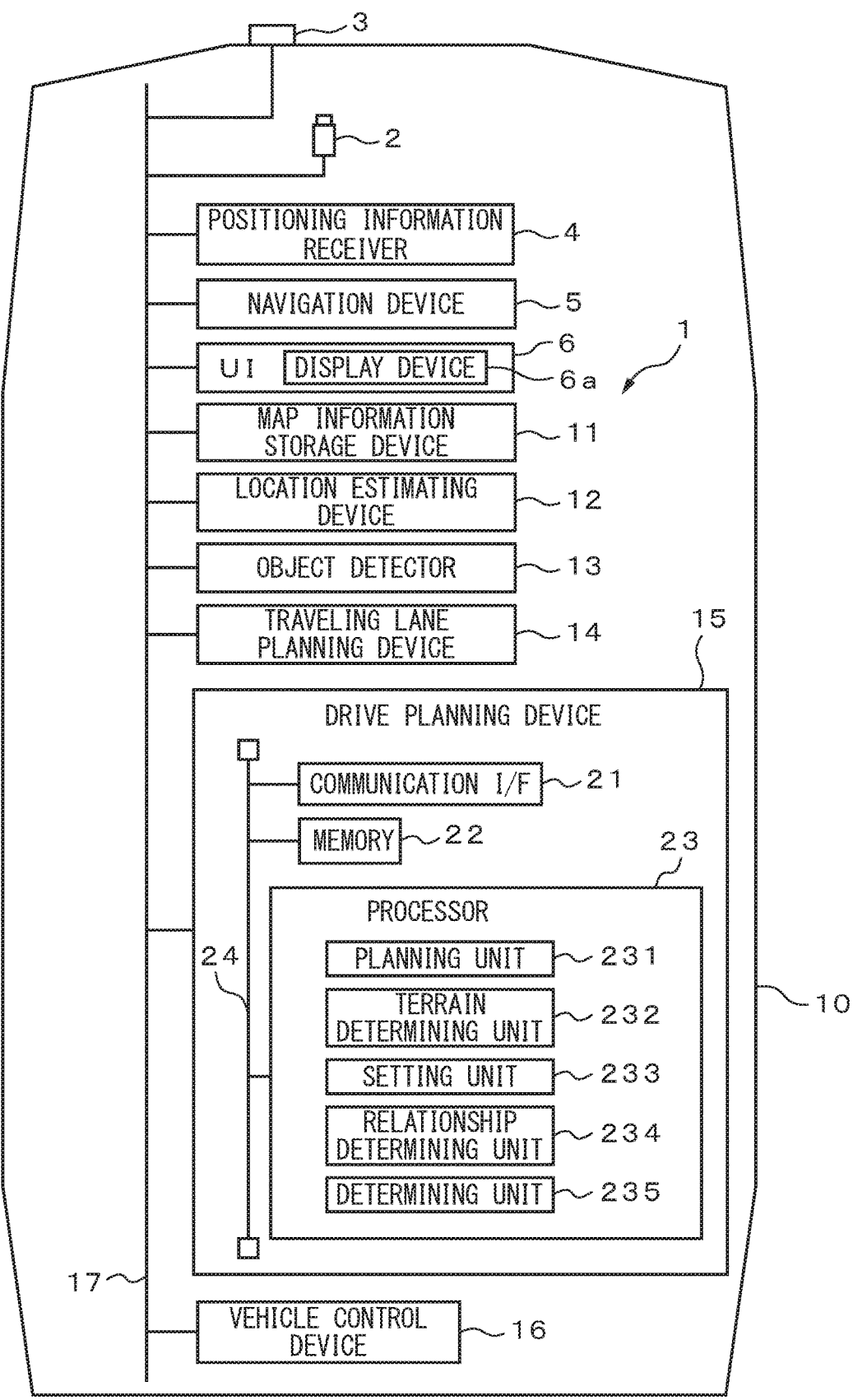
FIG. 2 is a general schematic drawing of a vehicle in which a vehicle control system of the embodiment is mounted.

FIG. 1A and FIG. 1B are diagrams showing operation of a drive planning device 15 according to an embodiment in overview. Operation for vehicle control processing by the drive planning device 15 as disclosed herein will now be described in overview with reference to FIG. 1A and FIG. 1B. The drive planning device 15 is an example of the vehicle control device.

As shown in FIG. 1A and FIG. 1B, a vehicle 10 travels on one lane 51 of a road 50. The vehicle 10 is an example of "the own vehicle". The vehicle 10 is traveling straight on the traffic lane 51 of the road 50.

An adjacent terrain J exists where a road 60 merges with the road 50 ahead of the current location of the vehicle 10. In the adjacent terrain J, a lane 61 and a lane 51 are connected between an adjacent start location 62 where the lane 61 begins to be adjacent to the lane 51, and an adjacent end location 63 where the lane 61 ceases to be adjacent to the lane 51. The lane 61 and lane 51 are divided by a lane marking line (lane boundary line) 65. The road 60 and lane 61 are adjacent lanes which are adjacent to the lane 51 of the road 50 in which the vehicle 10 is traveling, via the lane marking line 65.

In the adjacent terrain J, the lane 61 of the road 60 vanishes as it merges with the lane 51. In the adjacent terrain J, a vehicle 70 traveling in the lane 61 of the road 60 moves from the lane 61 to the lane 51. The vehicle 70 is an example of "another vehicle".

The vehicle 10 has a drive planning device 15. The vehicle 10 detects the vehicle 70 in the area ahead of the vehicle 10, based on information acquired by a sensor such as a camera 2. Referring to the location of the vehicle 70, the drive planning device 15 generates a driving plan representing a scheduled traveling trajectory for the vehicle 10 until a predetermined time ahead. The vehicle 10 may also be an autonomous vehicle.

In the example shown in FIG. 1A and FIG. 1B, the drive planning device 15 determines that an adjacent terrain J exists within the nearest driving zone, based on the current location of the vehicle 10 and map information.

Since it has been determined that an adjacent terrain J exists and the vehicle 70 has been detected traveling on the lane 61, the drive planning device 15 sets a first reference location P1 on the lane 61, to be used for determining whether or not the vehicle 10 is to travel ahead of the vehicle 70 (see FIG. 1A), before the vehicle 70 moves to the lane 51.

When the vehicle 10 is to travel ahead of the vehicle 70 before the vehicle 70 moves to the lane 51, the first reference location P1 can be set as the location limit where the vehicle 70 can make a lane change from the lane 61 to the lane 51.

The drive planning device 15 also sets a second reference location P2 on the lane 61, to be used for determining whether or not to create a space allowing the vehicle 70 to move ahead of the vehicle 10 (see FIG. 1B).

When a space allowing the vehicle 70 to move ahead of the vehicle 10 is to be created, the second reference location P2 can be set as the location limit where the vehicle 70 can make a lane change from the lane 61 to the lane 51.

The drive planning device 15 determines whether or not a first relationship is satisfied in which the location of the vehicle 10 is ahead of the location of the vehicle 70, while the vehicle 70 is moving from the current location to the first reference location P1, based on the respective speeds of the vehicle 10 and vehicle 70 and the respective locations of the vehicle 10 and vehicle 70. In some embodiments, the first relationship is decided based on data used to decide to cause the own vehicle to travel ahead of the other vehicle before the other vehicle moves to the traveling lane, from among data for traveling of multiple drivers in the adjacent terrain.

By determining whether or not the first relationship is satisfied, the drive planning device 15 can make a determination that is close to determining whether or not the vehicle 10 is to travel ahead of the vehicle 70 according to a common driver's own driving experience, before the vehicle 70 moves from the lane 61 to the lane 51.

The drive planning device 15 determines whether or not a second relationship is satisfied in which the location of the vehicle 10 is behind the location of the vehicle 70, while the vehicle 70 is moving from the current location to the second reference location P2, based on the respective speeds of the vehicle 10 and vehicle 70 and the respective locations of the vehicle 10 and vehicle 70. In some embodiments, the second relationship is decided based on data used to decide to create a space allowing the other vehicle to move ahead of the own vehicle, from among data for traveling of multiple drivers in the adjacent terrain.

By determining whether or not the second relationship is satisfied, the drive planning device 15 can make a determination that is close to determining whether or not to create a space allowing the vehicle 70 to move ahead of the vehicle 10 according to a common driver's own driving experience.

When it has been determined that the first relationship is satisfied, the drive planning device 15 decides that the vehicle 10 is to travel ahead of the vehicle 70, before the vehicle 70 moves from the lane 61 to the lane 51.

When it has been decided that the vehicle 10 is to travel ahead of the vehicle 70, the drive planning device 15 creates a driving plan for the vehicle 10 to travel in the lane 51, based on the speed set by the driver.

When it has been determined that the second relationship is satisfied, the drive planning device 15 decides to create a space 52 allowing the vehicle 70 to move ahead of the vehicle 10.

When it has been decided to create a space, the drive planning device 15 creates a driving plan that includes space creation processing whereby a space 52 allowing the vehicle 70 to move from the lane 61 is created in the lane 51 ahead of the vehicle 10.

As explained above, the drive planning device 15 can control the vehicle 10 in the adjacent terrain J so that it is operated with low divergence from operation of a vehicle 10 as commonly judged by a driver.

FIG. 2 is a general schematic drawing of a vehicle 10 in which a vehicle control system 1 of the embodiment is mounted. The vehicle 10 has a camera 2, a LiDAR sensor 3, a positioning information receiver 4, a navigation device 5, a user interface (UI) 6, a map information storage device 11, a location estimating device 12, an object detector 13, a traveling lane planning device 14, a drive planning device 15 and a vehicle control device 16, etc. The vehicle 10 may also have a millimeter wave radar, as a distance sensor (not shown) for measurement of the distance of the vehicle 10 to surrounding objects. The vehicle control system 1 has at least a drive planning device 15.

The camera 2, LiDAR sensor 3, positioning information receiver 4, navigation device 5, UI 6, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is an example of an imaging unit provided in the vehicle 10. The camera 2 is mounted inside the vehicle 10 and directed toward the front of the vehicle 10. The camera 2 captures a camera image in which the environment of a region in a predetermined visual field ahead of the vehicle 10 is shown, at a camera image photograph time set with a predetermined cycle, for example. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector. The camera image is an example of surrounding environment information.

Each time a camera image is captured, the camera 2 outputs the camera image and the camera image photograph time through the in-vehicle network 17 to the location estimating device 12 and the object detector 13, etc. The camera image is also used for processing at the location estimating device 12 to estimate the location of the vehicle 10. At the object detector 13, the camera image is used for processing to detect objects surrounding the vehicle 10.

The LiDAR sensor 3 is mounted on the outer side of the vehicle 10, for example, being directed toward the front of the vehicle 10. The LiDAR sensor 3 emits a scanning laser toward the predetermined visual field in front of the vehicle 10, at a reflected wave information acquisition time set with a predetermined cycle, and receives a reflected wave that has been reflected from a reflector. The time required for the reflected wave to return contains information for the distance between the vehicle 10 and objects located in the direction in which the laser has been emitted. The LiDAR sensor 3 outputs the reflected wave information that includes the laser emission direction and the time required for the reflected wave to return, together with the reflected wave information acquisition time at which the laser was emitted, through the in-vehicle network 17 to the object detector 13, etc., for example. At the object detector 13, the reflected wave information is used for processing to detect objects surrounding the vehicle 10. The reflected wave information is an example of surrounding environment information.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, etc., each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12, the traveling lane planning device 14 and the drive planning device 15, etc., via the in-vehicle network 17. The navigation device 5 does not create a navigation route when no destination location has been set.

The UI 6 is an example of the notification unit. The UI 6, controlled by the navigation device 5, drive planning device 15 and vehicle control device 16, etc., notifies the driver of the vehicle 10 traveling information. The traveling information of the vehicle 10 includes information relating to the current location of the vehicle and the current and future route of the vehicle, such as the navigation route. The UI 6 has a display device 6a such as a liquid crystal display or touch panel, for display of the traveling information. The UI 6 may also have an acoustic output device (not shown) to notify the driver of traveling information. The UI 6 also creates an operation signal in response to operation of the vehicle 10 by the driver. The operation information may be, for example, a destination location, transit points, vehicle speed or other control information, etc. The UI 6 also has a touch panel or operating button, for example, as an input device for inputting operation information from the driver to the vehicle 10. The UI 6 outputs the input operation information to the navigation device 5 and the drive planning device 15, etc., via the in-vehicle network 17.

The map information storage device 11 stores wide-area map information for a relatively wide area (an area of 10 $km^2$ to 30 $km^2$, for example) that includes the current location of the vehicle 10. In some embodiments, the map information has high-precision map information including three-dimensional information for the road surface, the speed limit for the road, the curvature of the road, and information for the types and locations of structures and road features such as road lane marking lines.

The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 $m^2$ to 10 $km^2$), through the in-vehicle network 17 to the location estimating device 12, object detector 13, traveling lane planning device 14, drive planning device 15 and vehicle control device 16, etc.

The location estimating device 12 estimates the location of the vehicle 10 at the camera image photograph time, based on the road features surrounding the vehicle 10 represented in the camera image taken by the camera 2a. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16, etc.

The object detector 13 detects objects around the vehicle 10, and their types, based on the camera image. Other objects also include other vehicles traveling around the vehicle 10. The object detector 13 detects objects represented in the camera image, by inputting the image into an identifier, for example. The identifier may use a deep neural network (DNN) that has been trained to detect objects represented in input images, for example. The object detector 13 used may also be an identifier other than a DNN. For example, the identifier used by the object detector 13 may be a support vector machine (SVM) that has been trained to output a confidence factor for representation of objects to be detected in the window, with the input being a feature descriptor (such as Histogram of Oriented Gradients, HOG, for example) calculated from a window set in the camera image. Alternatively, the object detector 13 may detect an object region by template matching between the image and a template in which an object to be detected is represented.

The object detector 13 may also detect objects around the vehicle 10 based on reflected wave information output by the LiDAR sensor 3. The object detector 13 may also determine the orientation of an object with respect to the vehicle 10 based on the location of the object in the camera image, and may determine the distance between the object and the vehicle 10, based on the orientation and on the reflected wave information output by the LiDAR sensor 3. The object detector 13 estimates the location of the object represented in a world coordinate system based on the current location of the vehicle 10, and the distance of the object from the vehicle 10 and its orientation, for example. The object detector 13 may also track an object to be detected from an updated image, by matching objects detected in the updated camera image with objects detected in previous images, according to a tracking process based on optical flow. The object detector 13 may also calculate the trajectory of an object being tracked, based on the location of the object in an image updated from a previous image, represented in the world coordinate system. The object detector 13 can estimate the speed of an object with respect to the vehicle 10, based on changes in the location of the object over the course of time. The object detector 13 can also estimate the acceleration of an object based on changes in the speed of the object over the course of time. In addition, the object detector 13 identifies the traveling lanes in which the objects are traveling, based on the lane marking lines represented in the map information and the locations of the objects. The object detector 13 also determines, for example, whether an object is traveling in a traffic lane defined by two mutually adjacent lane marking lines situated on either side of the center location of the object in the lateral direction.

The object detector 13 may also detect objects represented in reflected wave information, by inputting reflected wave information output by the LiDAR sensor 3 into an identifier. The identifier may use a deep neural network (DNN) that has been trained to detect objects represented in input reflected wave information, for example.

The object detector 13 may also calculate the length of an object based on reflected wave information output by the LiDAR sensor 3. Based on the reflected wave information, the object detector 13 forms a rectangular region surrounding the object, as viewed flat, and calculates its length in the traveling direction of the vehicle 10 in the rectangular region. The object detector 13 calculates object length based on the length in the traveling direction of the vehicle 10.

The object detector 13 outputs object detection information which includes information representing the types of objects that were detected, the lengths of the objects, information indicating their locations, and also information indicating their speeds, accelerations and traveling lanes, to the traveling lane planning device 14 and drive planning device 15, etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15, etc. of the traveling lane plan.

The drive planning device 15 carries out plan processing, terrain determination processing, setting processing, relationship determination processing and decision processing. The drive planning device 15 has a communication interface (IF) 21, a memory 22 and a processor 23 for this purpose. The communication interface 21, memory 22 and processor 23 are connected via signal wires 24. The communication interface 21 has an interface circuit to connect the drive planning device 15 with the in-vehicle network 17.

The memory 22 is an example of a memory unit, and it has a volatile semiconductor memory and a non-volatile semiconductor memory, for example. The memory 22 stores an application computer program and various data to be used for information processing carried out by the processor 23 of each device.

All or some of the functions of the drive planning device 15 are functional modules driven by a computer program operating on the processor 23, for example. The processor 23 has a planning unit 231, a terrain determining unit 232, a setting unit 233, a relationship determining unit 234 and a determining unit 235. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

At a driving plan creation time set with a predetermined cycle, the planning unit 231 carries out driving plan processing in which it generates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. In some embodiments, the driving plan is created so as to satisfy predetermined restrictions. The predetermined restrictions may be acceleration, deceleration and yaw rate, for example. The surrounding environment information includes the locations and speeds of other vehicles traveling around the vehicle 10. The vehicle status information includes the current location of the vehicle 10, and the vehicle speed, acceleration and traveling direction. The driving plan is represented as a combination of the target location of the vehicle 10 and the target vehicle speed at the target location, at each time from the current time until the predetermined time. In some embodiments, the cycle in which the driving plan is created is shorter than the cycle in which the traveling lane plan is created. The drive planning device 15 generates a driving plan to maintain a spacing of at least a predetermined distance between the vehicle 10 and objects (such as other vehicles). The drive planning device 15 outputs the driving plan to the vehicle control device 16, etc., for each driving plan generated.

When it has been decided to create a space to allow another vehicle traveling in the adjacent lane to move ahead of the vehicle 10, the planning unit 231 plans space creation processing for creation of the space. The planning unit 231 creates a driving plan that includes space creation processing. Space creation processing is not planned even when it has been decided to create a space, if it is necessary to create a driving plan that does not satisfy predetermined restrictions such as deceleration of at least a predetermined reference deceleration. Other operation by the drive planning device 15 will be described in detail below.

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also outputs a control signal corresponding to the set accelerator level, to a drive unit (engine or motor) of the engine of the vehicle 10, via the in-vehicle network 17. Alternatively, the vehicle control device 16 may output a control signal corresponding to a set brake level to the brake (not shown) of the vehicle 10, via the in-vehicle network 17.

The map information storage device 11, location estimating device 12, object detector 13, traveling lane planning device 14, drive planning device 15 and vehicle control device 16 are electronic control units (ECU), for example. For FIG. 2, the map information storage device 11, location estimating device 12, object detector 13, traveling lane planning device 14, drive planning device 15 and vehicle control device 16 were explained as separate devices, but all or some of them may be constructed in a single device.

Figure 3:
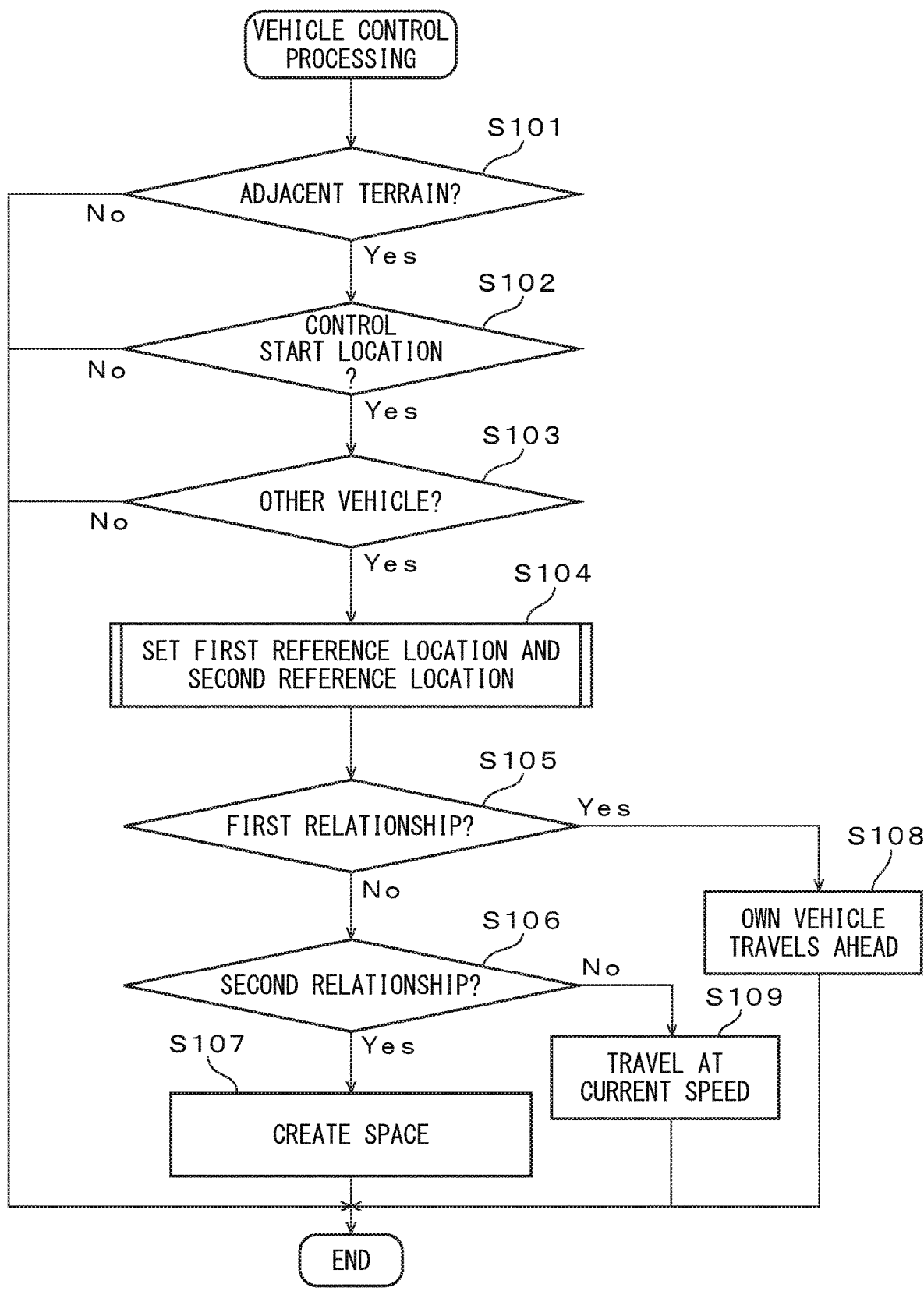
FIG. 3 is an example of an operation flow chart for vehicle control processing by a drive planning device of the embodiment.

FIG. 3 is an example of an operation flow chart for vehicle control processing by a drive planning device 15 of the embodiment. Vehicle control processing by the drive planning device 15 will be described with reference to FIG. 3. The drive planning device 15 carries out vehicle control processing according to the operation flow chart shown in FIG. 3, at a vehicle control time having a predetermined cycle.

First, the terrain determining unit 232 determines whether or not an adjacent terrain exists in which an adjacent lane that is adjacent to the traveling lane in which the vehicle 10 is traveling vanishes by merging with the traveling lane, within a predetermined range ahead on the course of the vehicle 10 from the current location of the vehicle 10 (step S101). Specifically, the terrain determining unit 232 determines whether or not an adjacent terrain exists within the nearest driving zone of the navigation route, based on the current location of the vehicle 10, the navigation route and the map information. In the adjacent terrain it is sometimes the case that another road merges with the road on which the vehicle 10 is traveling and an adjacent lane that is adjacent to the traveling lane vanishes by merging with the traveling lane (see FIG. 1A and FIG. 1B). In addition, it is sometimes the case in the adjacent terrain that an adjacent lane that is adjacent to the traveling lane vanishes by merging with the traveling lane, within the road on which the vehicle 10 is traveling (for example, terrain including an upwardly inclined lane). It is determined that an adjacent terrain exists up until the vehicle 10 passes through a merge end location where connection between the traveling lane and the adjacent lane ends.

When an adjacent terrain exists (step S101—Yes), the terrain determining unit 232 determines whether or not the vehicle 10 has reached a control start location where vehicle control processing is to start (step S102). The terrain determining unit 232 sets the control start location to be a location at a predetermined distance before the adjacent start location where connection between the traveling lane and adjacent lane begins. In some embodiments, the control start location is set at a location where the adjacent terrain is visible to the driver.

The predetermined distance may be determined based on the speed of the vehicle 10, for example. The speed of the vehicle 10 may be the legal speed limit for the road, the speed limit, or the most recent average speed of the vehicle 10. Sight distance, for example, may be used as the predetermined distance that is decided based on the speed of the vehicle 10. Sight distance is established for each legal speed limit, being the visible distance for drivers, with road structures being built when the road is constructed so as not to impede the visual field of drivers. When the vehicle 10 has not reached the control start location (step S102—No), the series of processing steps is complete. The control start location may also be a soft nose location, for example. Soft nose locations can be ascertained based on map information. When an adjacent terrain does not exist (step S101—No), the series of processing steps is likewise complete.

When the vehicle 10 has reached the control start location (step S102—Yes), the setting unit 233 determines whether or not another vehicle traveling in the adjacent lane has been detected based on the object detection information (step S103). The adjacent lane is the lane that vanishes by merging with the traveling lane in the adjacent terrain. This also applies in the following description. The processing in step S102 can optionally be omitted. In this case, if an adjacent terrain exists (step S101—Yes) then processing proceeds to step S103.

For this embodiment, the setting unit 233 determines whether or not another vehicle traveling in the adjacent lane has been detected ahead of the vehicle 10, based on object detection information. When the location of another vehicle is ahead of the location of the vehicle 10 in the traveling direction of the vehicle 10, the setting unit 233 determines that another vehicle traveling in the adjacent lane has been detected ahead of the vehicle 10.

When another vehicle has been detected (step S103—Yes), the setting unit 233 sets a first reference location on the adjacent lane to be used for determining whether or not the vehicle 10 is to travel ahead of the other vehicle, before the other vehicle moves to the traveling lane (step S104). The setting unit 233 also sets a second reference location on the adjacent lane, to be used for determining whether or not to create a space allowing the other vehicle to move ahead of the vehicle 10 (step S104). The first reference location and second reference location are set between the current location of the other vehicle and the adjacent end location. Processing by which the first reference location and second reference location are set by the setting unit 233 will be described in detail below.

As explained above, for this embodiment the first reference location and second reference location are set when another vehicle has been detected ahead of the vehicle 10.

Next, the relationship determining unit 234 determines whether or not a first relationship is satisfied in which the location of the vehicle 70 is ahead of the location of the other vehicle while the vehicle 70 is moving from the current location to the first reference location P1, based on the respective speeds of the vehicle 10 and the other vehicle and the respective locations of the vehicle 10 and the other vehicle (step S105). Processing by which it is determined by the relationship determining unit 234 whether or not the first relationship is satisfied will be described in detail below.

When the first relationship is not satisfied (step S105—No), the relationship determining unit 234 determines whether or not a second relationship is satisfied in which the location of the vehicle 70 is behind the location of the other vehicle while the vehicle 70 is moving from the current location to the second reference location P2, based on the respective speeds of the vehicle 10 and the other vehicle and the respective locations of the vehicle 10 and the other vehicle (step S106). Processing by which it is determined by the relationship determining unit 234 whether or not the second relationship is satisfied will be described in detail below.

When the second relationship is satisfied (step S106—Yes), the determining unit 235 decides to create a space allowing the other vehicle to move ahead of the vehicle 10 (step S107), and the series of processing steps is complete. The planning unit 231 also creates a driving plan that includes space creation processing.

When the first relationship is satisfied (step S105—Yes), on the other hand, the determining unit 235 decides that the vehicle 10 is to travel ahead of the other vehicle before the other vehicle moves from the adjacent lane to the traveling lane (step S108), and the series of processing steps is complete. The planning unit 231 creates a driving plan to allow the vehicle 10 to travel at a speed set by the driver. When the speed has been set by the driver so that the vehicle 10 follows the vehicle ahead, which is located ahead of the vehicle 10, the planning unit 231 creates the driving plan so that the vehicle 10 follows the vehicle ahead in the set speed range.

When the second relationship is not satisfied (step S106—No), the determining unit 235 decides for the vehicle 10 to travel at the current speed (step S109), and the series of processing steps is complete. The planning unit 231 creates a driving plan to allow the vehicle 10 to travel at a speed set by the driver.

Figure 4:
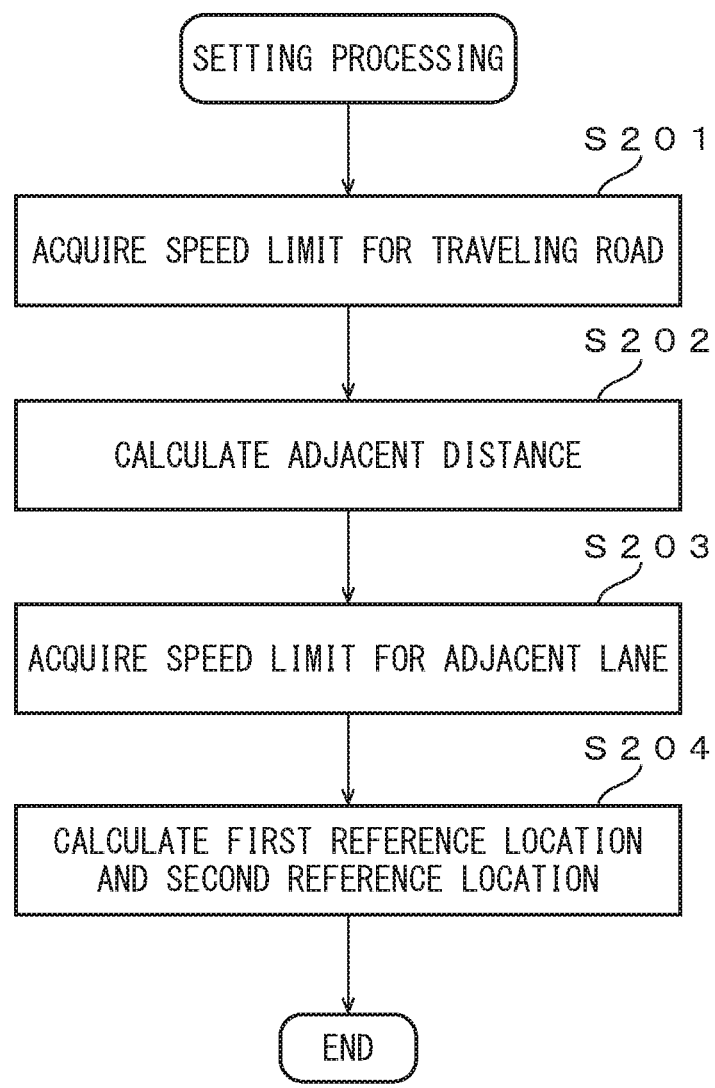
FIG. 4 is an example of an operation flow chart for setting processing by a drive planning device of the embodiment.

Processing whereby the first reference location and second reference location are set by the setting unit 233 will now be explained with reference to FIG. 4. FIG. 4 is an example of an operation flow chart for setting processing by the drive planning device 15 of the embodiment.

First, the setting unit 233 refers to the map information and acquires a speed limit for the road in which the vehicle 10 is traveling (step S201).

The setting unit 233 then calculates the adjacent distance for which the adjacent lane is adjacent to the traveling lane (step S202). The setting unit 233 refers to the map information and acquires an adjacent start location where the adjacent lane begins to be adjacent to the traveling lane (see FIG. 1A and FIG. 1), and an adjacent end location where the adjacent lane ceases to be adjacent to the traveling lane (see FIG. 1A and FIG. 1B). The setting unit 233 calculates the adjacent distance to be the distance between the adjacent start location and the adjacent end location. The traveling lane is the lane in which the vehicle 10 is traveling. This also applies in the following description.

The setting unit 233 then refers to the map information and acquires a speed limit for the adjacent lane in which the other vehicle is traveling (step S203).

The setting unit 233 then sets the first reference location P1 and second reference location P2 based on the speed limit A1 for the traveling road on which the vehicle 10 is traveling, and/or the adjacent distance A2, and/or the speed limit A3 for the adjacent lane (step S204).

For this embodiment, the setting unit 233 calculates the distance L1 from the adjacent end location to the first reference location P1 based on the speed limit A1, the adjacent distance A2 and the speed limit A3 for the adjacent lane, using the following formula (1).

$$L1 = \alpha_1 \times A1 + \beta_1 \times A2 + \gamma_1 \times A3 \tag{1}$$

Here, $\alpha_1$, $\beta_1$ and $\gamma_1$ are specified coefficients. The coefficients $\alpha_1$, $\beta_1$ and $\gamma_1$ are decided based on data used to decide that the own vehicle is to travel ahead of the other vehicle before the other vehicle moves to the traveling lane, from among data for traveling of multiple drivers in the adjacent terrain. In this case, the distance between the location where the other vehicle has moved to the traveling lane, and the adjacent end location, is used as the data corresponding to L1. The coefficients $\alpha_1$, $\beta_1$ and $\gamma_1$ may also be decided using multivariate analysis, for example.

The setting unit 233 sets a location at distance L1 before the adjacent end location, as the first reference location P1 on the adjacent lane.

The first reference location P1 decided in this manner can be considered to be the location limit where the other vehicle can make a lane change to the traveling lane, when the own vehicle is to travel ahead of another vehicle before the other vehicle moves to the traveling lane.

The setting unit 233 calculates the distance L2 from the adjacent end location to the second reference location based on the speed limit A1, the adjacent distance A2 and the speed limit A3 for the adjacent lane, using the following formula (2).

$$L2 = \alpha_2 \times A1 + \beta_2 \times A2 + \gamma_2 \times A3 \tag{2}$$

Here, $\alpha_2$, $\beta_2$ and $\gamma_2$ are specified coefficients. The coefficients $\alpha_2$, $\beta_2$ and $\gamma_2$ are decided based on data used to decide to create a space allowing the other vehicle to move ahead of the own vehicle, from among data for traveling of multiple drivers in the adjacent terrain, for example. In this case, the distance between the location where the other vehicle has moved to the traveling lane, and the adjacent end location, is used as the data corresponding to L2. The coefficients $\alpha_2$, $\beta_2$ and $\gamma_2$ may also be decided using multivariate analysis, for example.

The setting unit 233 sets a location at distance L2 before the adjacent end location, as the second reference location P2 on the adjacent lane.

The second reference location P2 decided in this manner can be considered to be the location limit where the other vehicle can make a lane change to the traveling lane, when a space allowing the other vehicle to move ahead of the own vehicle is to be created.

Figure 5:
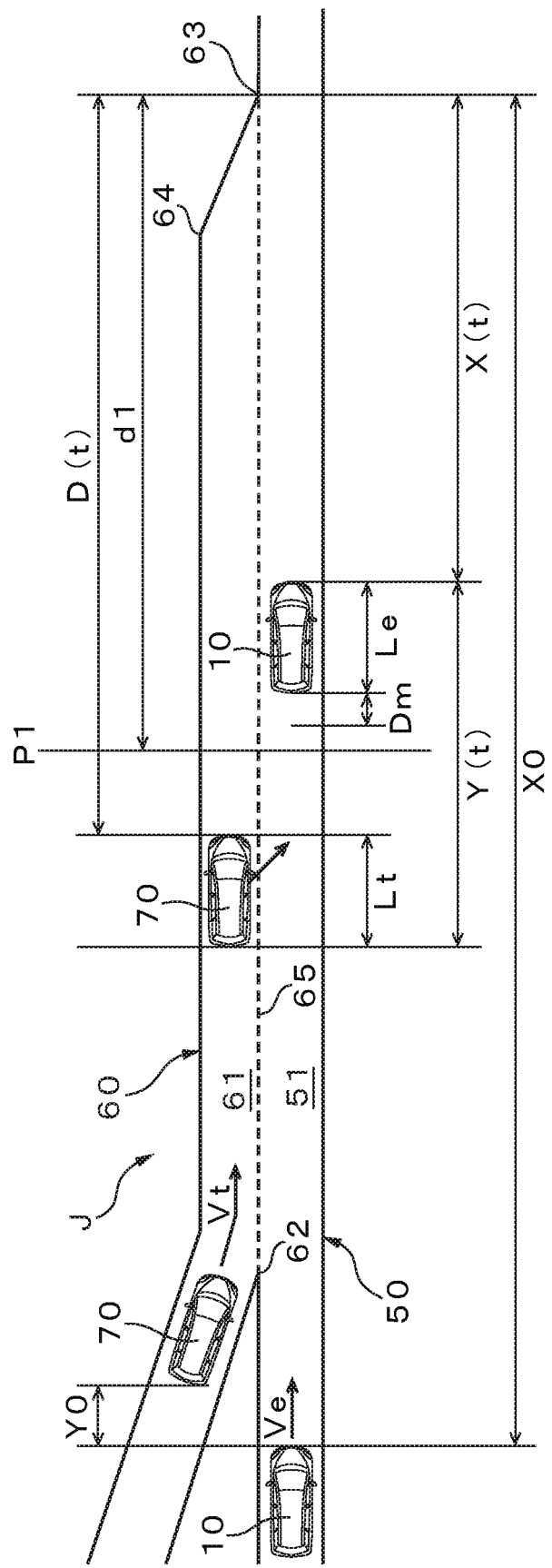
FIG. 5 is a diagram illustrating vehicle control processing by a drive planning device (1).

Processing by which it is determined by the relationship determining unit 234 whether or not the first relationship is satisfied will now be explained with reference to FIG. 5.

The relationship determining unit 234 determines whether or not a first relationship is satisfied in which the location of the vehicle 10 is ahead of the location of the vehicle 70, while the vehicle 70 is moving from the current location to the first reference location P1, based on speeds of the vehicle 10 and vehicle 70 and the locations of the vehicle 10 and vehicle 70.

For this embodiment, the first relationship includes that the speed of the vehicle 10 is faster than the speed of the other vehicle while the vehicle 70 is moving from the current location to the first reference location P1, and that the location of the vehicle 10 is ahead of the location of the vehicle 70, in the traveling direction of the vehicle 10.

Specifically, the relationship determining unit 234 determines whether or not a first relationship is satisfied in which the speed of the vehicle 10 is faster than the speed of the other vehicle, while the vehicle 70 is moving from the current location to the first reference location P1, and that the location of the vehicle 10 is ahead of the location of the vehicle 70, in the traveling direction of the vehicle 10, based on speeds of the vehicle 10 and vehicle 70 and the locations of the vehicle 10 and vehicle 70.

The relationship determining unit 234 determines whether or not the first relationship is satisfied as represented by the following formula (3), for the distance D(t) between the vehicle 70 and the adjacent end location 63, the distance d1 between the first reference location P1 and the adjacent end location 63, the distance Y(t) between the vehicle 10 and the vehicle 70, the length Le of the vehicle 10, the length Lt of the vehicle 70, the minimum intervehicular distance Dm to be ensured between the vehicle 10 and the vehicle 70, the speed of the vehicle 10 Ve(t), and the speed of the vehicle 70 Vt(t). The distance Y(t) is the distance between the front end of the vehicle 10 and the back end of the vehicle 70. The distance Dm may be decided based on the relative speeds of the vehicle 10 and vehicle 70, for example. The variable "t" represents time.

$$d1<D(t) \text{ and } Y(t)-Lt-Le>=Dm \text{ and } Ve(t)>Vt(t) \qquad (3)$$

The relationship determining unit 234 determines whether or not the first relationship is satisfied, assuming that the vehicle 10 and the vehicle 70 travel at constant velocities while the vehicle 70 moves from the current location (determining time point) to the first reference location P1. The respective speeds at the determining time point are used as the speeds for the vehicle 10 and the vehicle 70.

It is assumed that the vehicle 10 travels at the speed at determining time point and the vehicle 70 travels at the speed at determining time point. The determining time point is the time at which the first relationship is determined by the relationship determining unit 234.

Specifically, the relationship determining unit 234 determines that the first relationship is satisfied when there exists a distance X0 between the vehicle 10 and the adjacent end location 63 and a distance Y0 between the vehicle 10 and the vehicle 70, satisfying the first relationship, while the vehicle 70 is moving from the current location (determining time point) to the first reference location P1.

The distance D(t) is represented by the following formula (4).

$$D(t)=X(t)+Y(t)-Lt=X0-Y0-Vt \times t-Lt \qquad (4)$$

Here, X(t) is the distance between the vehicle 10 and the adjacent end location 63 at time t, and Y(t) is the distance between the vehicle 10 and the vehicle 70 at time t.

The distance X(t) is represented by the following formula (5).

$$X(t)=X0-Ve \times t \qquad (5)$$

The distance Y(t) is represented by the following formula (6).

$$Y(t)=Ve \times t-(Y0+Vt \times t) \qquad (6)$$

The time t required for the vehicle 10 to pass the vehicle 70 and travel a distance of at least the minimum intervehicular distance Dm from the current location (determining time point), is represented by the following formula (7).

$$t>=(Dm+Lt+Le+Y0)/(Ve-Vt) \qquad (7)$$

The relationship d1<D(t) in formula (3) can be expressed as the following formula (8), representing D(t) in terms of formulas (4) and (7).

$$d1<X0-Y0-Vt \times (Dm+Lt+Le+Y0)/(Ve-Vt)-Lt \qquad (8)$$

Formula (8) can be rewritten as the following formula (9).

$$Y0<(Ve-Vt)/Ve \times (X0-d1)-Vt/Ve \times (Dm+Le)-Lt \qquad (9)$$

The first relationship represented by formula (3) can therefore be simplified as the following formula (10).

Formula (9) and Ve(t)>Vt(t)  (10)

The relationship determining unit 234 determines that the first relationship is satisfied when distance X0 and distance Y0 exist satisfying formula (10), allowing the respective locations of the vehicle 10 and vehicle 70 to evolve in time and assuming that the vehicle 10 and the vehicle 70 are at constant speed.

For this embodiment, the adjacent end location 63 may be a taper start location 64 where the width of the lane 61 begins to decrease. In this case, D(t) may be the distance between the vehicle 70 and the taper start location 64 where the width of the lane 61 begins to decrease. Also, d1 may be the distance between the first reference location P1 and the taper start location 64. Variable X(t) may be the distance between the vehicle 10 and the taper start location 64 at time t. Variable X0 may be the distance between the vehicle 10 and the taper start location 64.

Following step S104 described above, the relationship determining unit 234 may determine whether or not the speed of the vehicle 10 is faster than the speed of the other vehicle, and when the speed of the vehicle 10 is not faster than the speed of the other vehicle, it may determine that the first relationship is not satisfied and processing may proceed to step S108, or if it is faster, processing may proceed to step S105.

Figure 6:
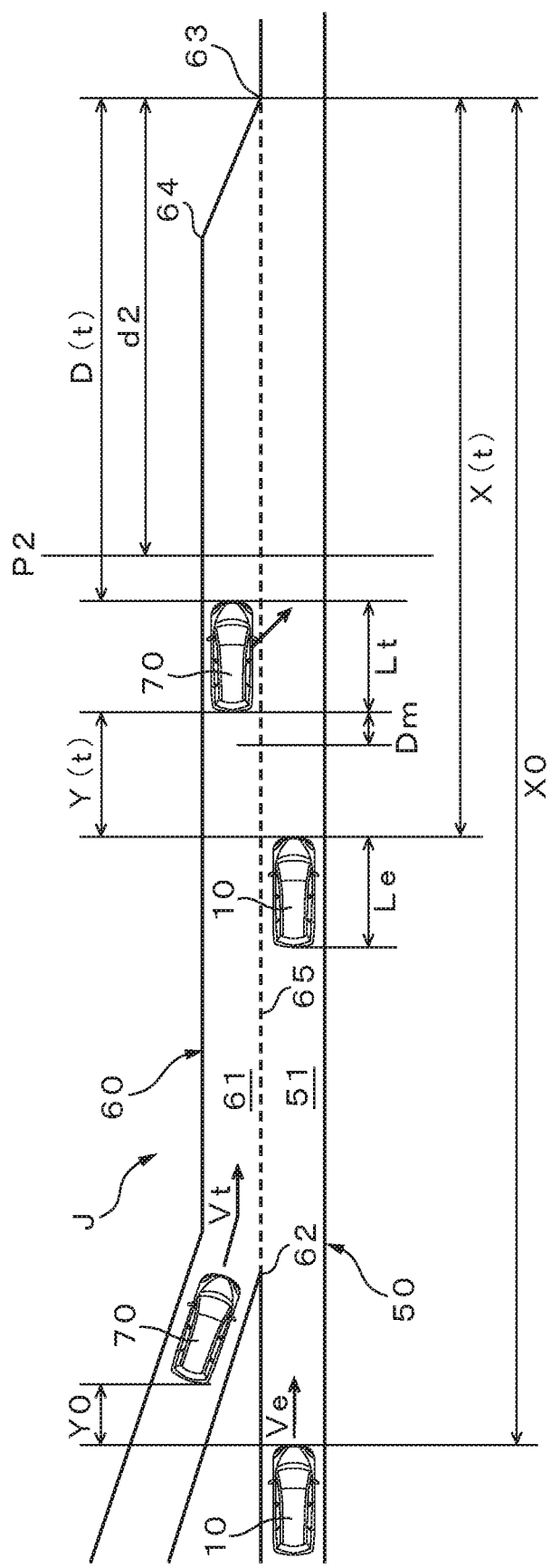
FIG. 6 is a diagram illustrating vehicle control processing by a drive planning device (2).

Processing by which it is determined by the relationship determining unit 234 whether or not the second relationship is satisfied will now be explained with reference to FIG. 6.

The relationship determining unit 234 determines whether or not the second relationship is satisfied in which the location of the vehicle 10 is behind the location of the vehicle 70, while the vehicle 70 is moving from the current location (determining time point) to the second reference location P2, based on speeds of the vehicle 10 and vehicle 70 and the locations of the vehicle 10 and vehicle 70. The determining time point is the time at which the second relationship is determined by the relationship determining unit 234.

For this embodiment, the second relationship includes that the speed of the vehicle 10 is slower than the speed of the vehicle 70 while the vehicle 70 is moving from the current location (determining time point) to the second reference location P2, and that the location of the vehicle 10 is behind the location of the vehicle 70.

Specifically, the relationship determining unit 234 determines whether or not the second relationship is satisfied in which the speed of the vehicle 10 is slower than the speed of the vehicle 70, while the vehicle 70 is moving from the current location (determining time point) to the second reference location P2, and the location of the vehicle 10 is behind the location of the vehicle 70, in the traveling direction of the vehicle 10, based on speeds of the vehicle 10 and vehicle 70 and the locations of the vehicle 10 and vehicle 70.

The relationship determining unit 234 determines whether or not the second relationship is satisfied as represented by the following formula (11), for the distance D(t) between the vehicle 70 and the adjacent end location 63, the distance d2 between the second reference location P2 and the adjacent end location 63, the distance Y(t) between the vehicle 10 and the vehicle 70, the minimum intervehicular distance Dm to be ensured between the vehicle 10 and the vehicle 70, the speed of the vehicle 10 Ve(t), and the speed of the vehicle 70 Vt(t). The distance Y(t) is the distance between the front end of the vehicle 10 and the back end of the vehicle 70. The distance Dm may be decided based on the relative speeds of the vehicle 10 and vehicle 70, for example. The variable "t" represents time.

$$d2 < D(t) \text{ and } Y(t) >= Dm \text{ and } Ve(t) < Vt(t) \quad (11)$$

The distance D(t) is represented by the following formula (12).

$$D(t) = X(t) + Y(t) - Lt \quad (12)$$

The distance X(t) is represented by the following formula (13).

$$X(t) = X0 - (\tfrac{1}{2} \times Ae \times t^2 + Ve(t) \times t) \quad (13)$$

The distance X0 is the distance between the vehicle 10 and the adjacent end location 63. The variable "Ae" is the deceleration for the vehicle 10.

The distance Y(t) is represented by the following formula (14).

$$Y(t) = Y0 + (\tfrac{1}{2} \times At \times t^2 + Vt(t) \times t) - (\tfrac{1}{2} \times Ae \times t^2 + Ve(t) \times t) \quad (14)$$

The distance Y0 is the distance between the vehicle 10 and the vehicle 70. The variable "At" is the acceleration for the vehicle 70.

The relationship determining unit 234 determines whether or not the second relationship is satisfied, assuming that the vehicle 10 travels at a constant deceleration and the vehicle 70 travels at a constant acceleration, while the vehicle 70 moves from the current location (determining time point) to the second reference location P2. For example, the relationship determining unit 234 assumes that the vehicle 10 is at constant deceleration of 1.5 m/s². The speed of the vehicle 10 at the determining time point is the initial speed of the vehicle 10, and the speed of the vehicle 70 at the determining time point is the initial speed of the vehicle 70.

At the second reference location P2, At may be determined so that the speed of the vehicle 70 Vt(t) matches the speed of the vehicle 10 Ve(t). Specifically, the acceleration At can be calculated by the following formula (15).

$$At = (Ve(t)^2 - Vt(t)^2)/(2 \times (X0 - Y0 - Lt - d2)) \quad (15)$$

Here, a lower limit (such as 0 m/s²) and an upper limit (such as 2.0 m/s²) may be set for acceleration At.

Specifically, the relationship determining unit 234 determines that the second relationship is satisfied when there exists a distance X0 between the vehicle 10 and the adjacent end location 63 and a distance Y0 between the vehicle 10 and the vehicle 70, satisfying the second relationship, while the vehicle 70 is moving from the current location (determining time point) to the second reference location P2.

The relationship determining unit 234 determines that the second relationship is satisfied when distance X0 and distance Y0 exist satisfying formula (11), allowing the respective locations of the vehicle 10 and vehicle 70 to evolve in time.

For this embodiment, the adjacent end location 63 may be a taper start location 64 where the width of the lane 61 begins to decrease. In this case, D(t) may be the distance between the vehicle 70 and the taper start location 64 where the width of the lane 61 begins to decrease. Also, d2 may be the distance between the second reference location P2 and the taper start location 64. Variable X(t) may be the distance between the vehicle 10 and the taper start location 64 at time t. Variable X0 may be the distance between the vehicle 10 and the taper start location 64.

As explained above, the drive planning device determines that the own vehicle is to travel ahead of another vehicle, or determines to create a space allowing the other vehicle to move ahead of the own vehicle, based on a first reference location and second reference location and on the respective speeds of the own vehicle and the other vehicle and the respective locations of the own vehicle and the other vehicle in the adjacent terrain, thereby allowing control of the own vehicle so that it is operated with low divergence from operation of a vehicle as commonly judged by a driver.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the present disclosure and its equivalents as laid out in the Claims.

For example, in the embodiment described above the second relationship was determined when the first relationship is not satisfied, but the first relationship and second relationship may also be determined independently. When both the first relationship and second relationship are satisfied, it is decided that the own vehicle is to travel ahead of the other vehicle before the other vehicle moves to the traveling lane.

The invention claimed is:

1. A vehicle control device comprising:
  a processor configured to
    determine whether or not an adjacent terrain where an adjacent lane is adjacent to a traveling lane in which an own vehicle is traveling, between an adjacent start location where the adjacent lane begins to be adjacent to the traveling lane and an adjacent end location where the adjacent lane ceases to be adjacent to the traveling lane, is within a predetermined range ahead of the own vehicle,
    set a first reference location on the adjacent lane to be used for determining whether or not the own vehicle is to travel ahead of another vehicle before the other vehicle moves to the traveling lane, and to set a second reference location on the adjacent lane to be used for determining whether or not to create a space allowing the other vehicle to move ahead of the own vehicle, when it has been determined that the adjacent terrain exists and the other vehicle traveling in the adjacent lane has been detected,
    determine whether or not a first relationship is satisfied in which a location of the own vehicle is ahead of a location of the other vehicle while the other vehicle is moving from the other vehicle's current location to the first reference location, based on respective speeds of the own vehicle and the other vehicle and respective locations of the own vehicle and the other vehicle,
    determine whether or not a second relationship is satisfied in which a location of the own vehicle is behind a location of the other vehicle while the other vehicle is moving from the other vehicle's current location to the second reference location, based on the respective speeds of the own vehicle and the other vehicle and the respective locations of the own vehicle and the other vehicle, and decide to cause the own vehicle to travel ahead of the other vehicle before the other vehicle moves to the traveling lane when it has been determined that the first relationship is satisfied, or to decide to create a space allowing the other vehicle to move ahead of the own vehicle when it has been determined that the second relationship is satisfied.

2. The vehicle control device according to claim 1, wherein the first relationship includes that the speed of the own vehicle is faster than the speed of the other vehicle and the location of the own vehicle is ahead of the location of the other vehicle, while the other vehicle is moving from the other vehicle's current location to the first reference location.

3. The vehicle control device according to claim 2, wherein the processor is further configured to determine whether or not the first relationship is satisfied, assuming that the own vehicle is traveling at a speed of the own vehicle at the determining time and the other vehicle is traveling at a speed of the other vehicle at the determining time.

4. The vehicle control device according to claim 1, wherein the second relationship includes that the speed of the own vehicle is slower than the speed of the other vehicle and the location of the own vehicle is behind the location of the other vehicle, while the other vehicle is moving from the other vehicle's current location to the second reference location.

5. The vehicle control device according to claim 4, wherein the processor is further configured to determine whether or not the second relationship is satisfied, assuming that the own vehicle is traveling at constant deceleration and the other vehicle is traveling at constant acceleration.

6. The vehicle control device according to claim 1, wherein the processor is further configured to set the first reference location and second reference location on the adjacent lane, when it has been determined that the adjacent terrain exists and the other vehicle traveling in the adjacent lane has been detected ahead of the own vehicle.

7. The vehicle control device according to claim 1, wherein the processor is further configured to set the first reference location and second reference location based on a speed limit of a road on which the own vehicle is traveling, the distance for which the adjacent lane is adjacent to the traveling lane, or a speed limit for the adjacent lane in which the other vehicle is traveling.

8. A computer-readable, non-transitory storage medium storing a computer program for vehicle control which causes a processor to execute a process, the process comprising:

determining whether or not an adjacent terrain where an adjacent lane is adjacent to a traveling lane in which an own vehicle is traveling, between an adjacent start location where the adjacent lane begins to be adjacent to the traveling lane and an adjacent end location where the adjacent lane ceases to be adjacent to the traveling lane, is within a predetermined range ahead of the own vehicle;

setting a first reference location on the adjacent lane to be used for determining whether or not the own vehicle is to travel ahead of the other vehicle before the other vehicle moves to the traveling lane, and setting a second reference location on the adjacent lane to be used for determining whether or not to create a space allowing the other vehicle to move ahead of the own vehicle, when it has been determined that the adjacent terrain exists and the other vehicle traveling in the adjacent lane has been detected;

determining whether or not a first relationship is satisfied in which a location of the own vehicle is ahead of a location of the other vehicle while the other vehicle is moving from the other vehicle's current location to the first reference location, based on respective speeds of the own vehicle and the other vehicle and respective locations of the own vehicle and the other vehicle;

determining whether or not a second relationship is satisfied in which a location of the own vehicle is behind a location of the other vehicle while the other vehicle is moving from the other vehicle's current location to the second reference location, based on the respective speeds of the own vehicle and the other vehicle and the respective locations of the own vehicle and the other vehicle; and deciding to cause the own vehicle to travel ahead of the other vehicle before the other vehicle moves to the traveling lane when it has been determined that the first relationship is satisfied, or deciding to create a space allowing the other vehicle to move ahead of the own vehicle when it has been determined that the second relationship is satisfied.

9. A method for controlling a vehicle carried out by a vehicle control device and the method comprising:

determining whether or not an adjacent terrain where an adjacent lane is adjacent to a traveling lane in which an own vehicle is traveling, between an adjacent start location where the adjacent lane begins to be adjacent to the traveling lane and an adjacent end location where the adjacent lane ceases to be adjacent to the traveling lane, is within a predetermined range ahead of the own vehicle;

setting a first reference location on the adjacent lane to be used for determining whether or not the own vehicle is to travel ahead of the other vehicle before the other vehicle moves to the traveling lane, and setting a second reference location on the adjacent lane to be used for determining whether or not to create a space allowing the other vehicle to move ahead of the own vehicle, when it has been determined that the adjacent terrain exists and the other vehicle traveling in the adjacent lane has been detected;

determining whether or not a first relationship is satisfied in which a location of the own vehicle is ahead of a location of the other vehicle while the other vehicle is moving from the other vehicle's current location to the first reference location, based on respective speeds of the own vehicle and the other vehicle and respective locations of the own vehicle and the other vehicle;

determining whether or not a second relationship is satisfied in which a location of the own vehicle is behind a location of the other vehicle while the other vehicle is moving from the other vehicle's current location to the second reference location, based on the respective speeds of the own vehicle and the other vehicle and the respective locations of the own vehicle and the other vehicle; and deciding to cause the own vehicle to travel ahead of the other vehicle before the other vehicle moves to the traveling lane when it has been determined that the first relationship is satisfied, or deciding to create a space allowing the other vehicle to move ahead of the own vehicle when it has been determined that the second relationship is satisfied.

\* \* \* \* \*